June 26, 1934.  O. K. ENZOR  1,963,959

ELECTROLYTIC GAS PRODUCING DEVICE

Filed Jan. 23, 1933  2 Sheets-Sheet 1

Inventor,
Ora K. Enzor,
By Minturn & Minturn
Attorneys.

June 26, 1934.   O. K. ENZOR   1,963,959
ELECTROLYTIC GAS PRODUCING DEVICE
Filed Jan. 23, 1933    2 Sheets-Sheet 2
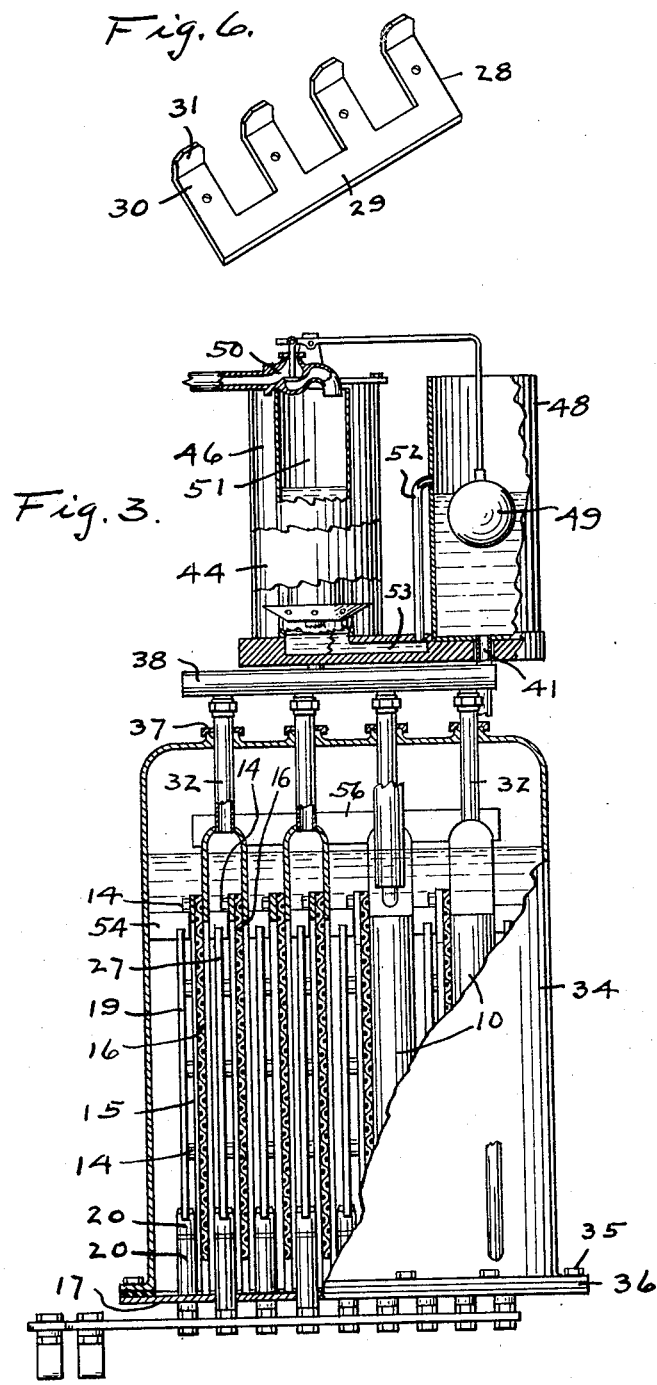
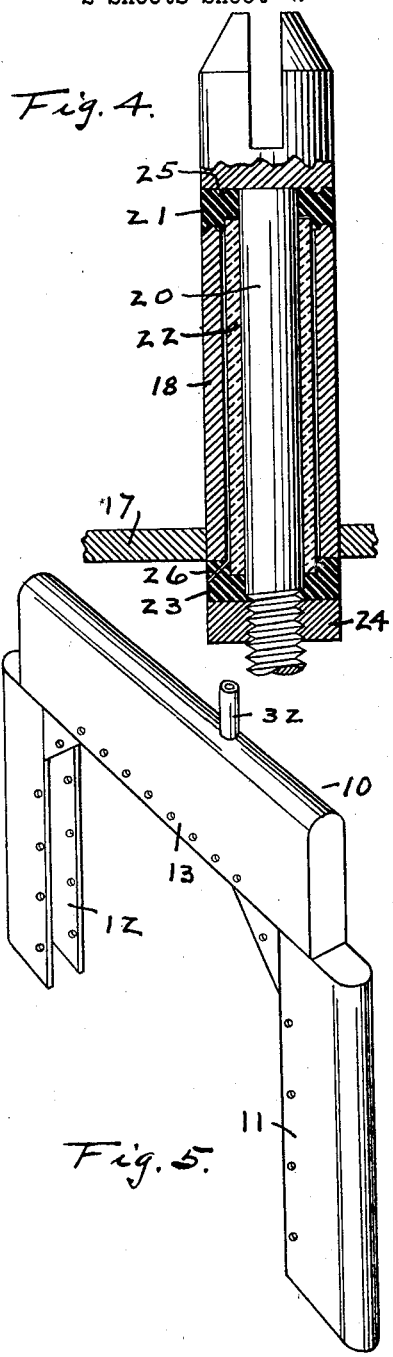
Inventor,
Ora K. Enzor,
By Minturn & Minturn
Attorneys.

Patented June 26, 1934

1,963,959

UNITED STATES PATENT OFFICE 1,963,959

ELECTROLYTIC GAS PRODUCING DEVICE

Ora K. Enzor, Indianapolis, Ind., assignor of one-fourth to Howard E. Dorsey, Indianapolis, Ind.

Application January 23, 1933, Serial No. 652,976

16 Claims. (Cl. 204—5)

This invention relates to apparatus for producing hydrogen and oxygen gases by electrolysis and has for one of its principal objects the provision in a multiple cell unit of a structure which will permit fabrication and assembly at a low cost and which will have a removable outside shell for the purpose of permitting inspection of the various electrodes and separators without having to disassemble such parts.

Figure 1:
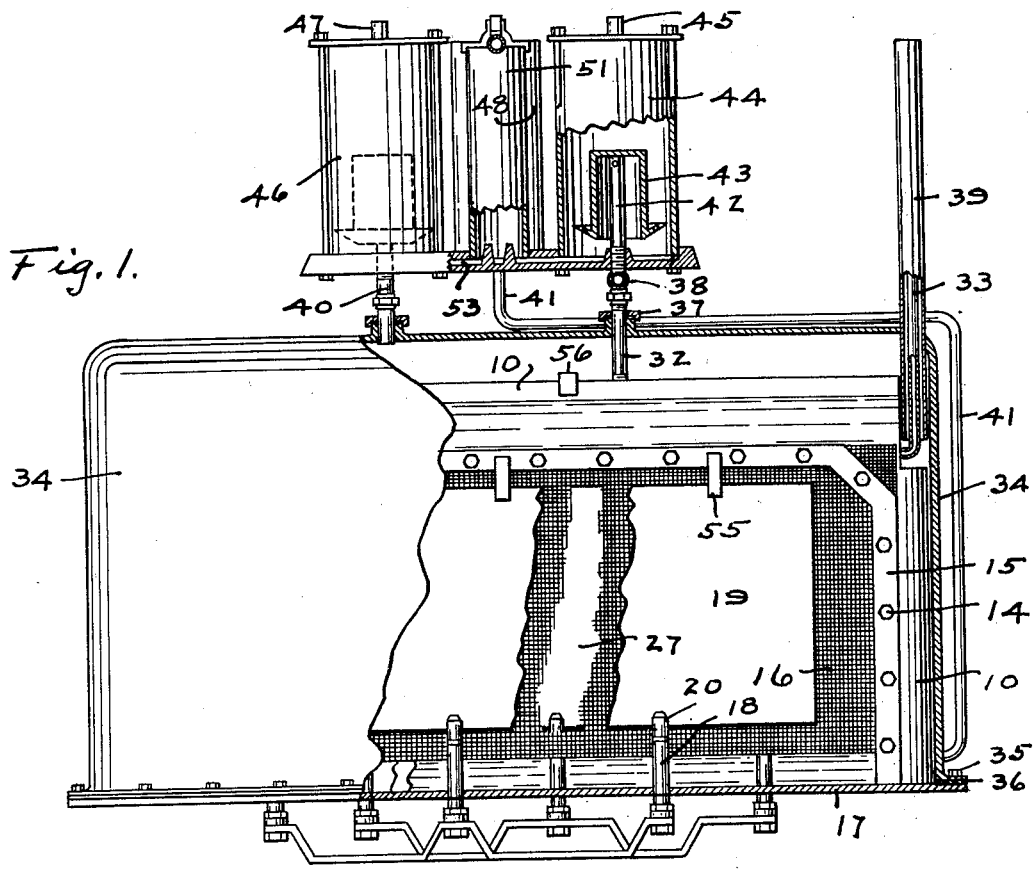
Figure 2:
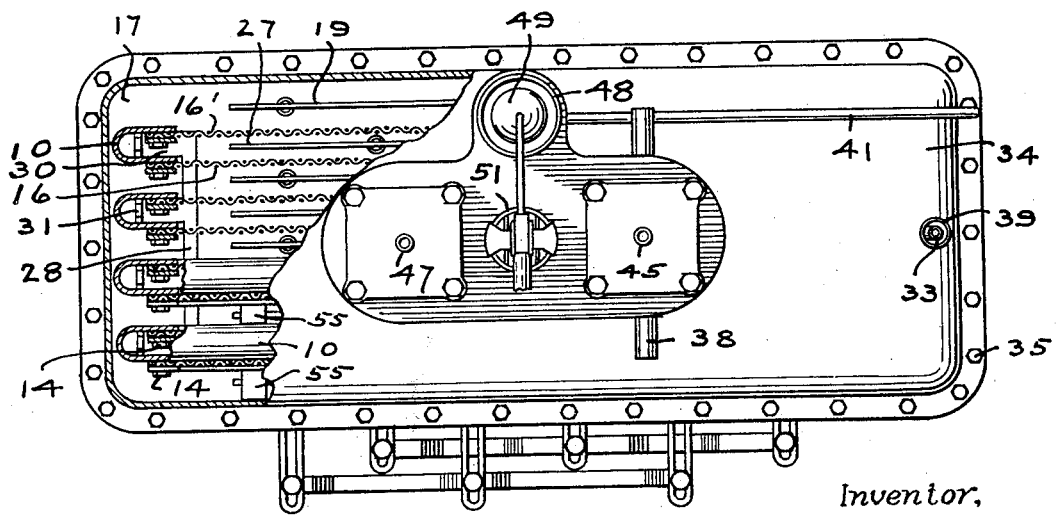

This invention is a continuation in part of the invention as disclosed in my application for U. S. Letters Patent filed May 31, 1932, Serial Number 614,379. While substantially the same principle is embodied in my present invention as that disclosed in the previous application, the principal improvement thereover resides in the mechanical construction which materially reduces the cost of fabricating and assembling. In my present invention, the separators between electrodes are assembled on a removable metallic member which may be removed at will for inspection of the electrode normally carried between the separators. The inherent advantages of my present invention will become apparent in the following description to those versed in the art. Reference is made to the accompanying drawings, in which Fig. 1 is a fragmentary side elevation of a structure embodying my invention;

Fig. 2, a fragmentary top plan view of the structure;

Fig. 3, a fragmentary end elevation;

Fig. 4, a detail in fragmentary vertical section through an electrode support or terminal;

Fig. 5, a view in perspective of a separator carrying member, and

Fig. 6, a view in perspective of a separator carrying member locating bracket.

Like characters of reference indicate like parts in the several views in the drawings.

The present form of the invention involves the use of a solution of sodium hydroxide in water within which are carried a number of electrodes in the form of plates of substantially pure iron and of nickel or of nickel plated iron. In the drawings, a unit is more or less diagrammatically illustrated showing nine of such plates, the number varying as desired, and any number of the units being adapted to be hooked up to form a battery.

A number of separator carrying members 10, Fig. 5, are formed to have spaced apart, vertically disposed legs 11 and 12, each leg being U-shaped in transverse horizontal section with the open sides directed toward each other. These legs are spaced apart in fixed position by a transversely disposed head 13, the ends of which are closed, and a vertical section through which gives a U-shaped wall with the opening along the under side thereof. Preferably the legs 11 and 12 are secured to the head 13 to have the closed ends of the head spaced inwardly somewhat from the outer vertical ends of the legs as indicated in Fig. 5, the upper ends of the legs 11 and 12, not covered over by the head 13, being closed-over. The edges of the walls of the legs 11 and 12 and of the head 13 along its open side are drilled through and tapped to receive cap screws 14, Figs. 1 and 2, which are passed through retaining bars 15 and separators 16 as a means of securing the separators in place. Separators are assembled on the members 10 in a uniform manner to have a separator 16' secured around the inner faces of the walls of the legs and head 13, and a separator 16 secured against the outer faces of the opposing walls so that the separator 16' is on the inside of the legs while the separator 16 is on the outside to have the separators thus spaced apart but with the cap screw heads all turned in the same direction.

A base plate 17 is provided with a plurality of thimbles 18 welded thereto with openings therethrough extending through the floor. These thimbles 18 are arranged in transverse rows, the thimbles in one row being in staggered relation to those in the other row. The rows of thimbles are spaced apart a distance as determined by the desired spacing apart of the electrodes to be employed. Beginning at one side of the plate 17, negative plates 19 of relatively pure iron are mounted on alternating rows of thimbles 18 by means of posts 20 which are welded thereto and which pass down through the thimbles to extend therethrough below the under side of the floor 17. An insulating collar 21 is placed between the underside of the head of the post 20 and the top of the thimbles 18 in each instance while an insulating bushing 22 surrounds the post within the thimble 18 and an insulating collar 23 is pressed up against the bottom of the thimble, and compressively forced thereagainst by means of a nut 24 screwthreadedly carried by the post 20. The head of the post 20 which engages the electrode has an annular rib 25 extending downwardly and the upper end of the thimble 18 is provided with an upwardly extending rib, both of which ribs are embedded within the collar 21 so as to provide a sealed joint between the head and the thimble to prevent the escape of any of the electrolyte therebetween. Should any electrolyte leak through any of this joint, the lower collar 23 has a drain hole 26 communicating from within the thimble through which hole the electrolyte may flow and thus be observed in case of a leak. Each of the plates 19 has two or more of these supporting and mounting posts 20, here shown as three in number.

Positive electrodes 27 are in the same manner mounted between adjacent plates 19 to be supported by like posts on the thimbles in exactly the same manner. The plates 27 are made either of pure nickel or operate very satisfactorily when made of relatively pure iron and are nickel plated. In the structure thus defined, there are five of the negative plates 19 and four of the positive plates 27, all carried in fixed positions to extend vertically upwardly from the floor 17 in parallel spaced apart relation.

After the electrodes have been assembled on the floor 17 as above indicated, the separator carrying members 10, four in number for the above indicated structure, are let down over the plates 27 so as to have one plate between the separators 16 and 16' of each member 10. The lower ends of the legs 11 and 12 rest directly upon the floor 17 and are located and maintained in spaced relation in respect to the adjacent member by means of a bracket 28, Fig. 6, which is attached to the floor 17, one at each end thereof. Each bracket 28 comprises a bar 29 from which extend arms 30 with an upturned tongue 31 at the outer end of each arm. The arms 30 are spaced along the bar 29 at the proper distances to permit the lower ends of the legs 11 or 12, as the case may be, to be let down over the upturned tongues 31 and arms 30 and thereby space the members 10 to have the electrodes 27 enclosed therewithin spaced substantially centrally between the separators of the members 10.

The head 13 of each member 10 has an outlet pipe 32 welded thereto and extending vertically upward. At least one of the members 10 has a safety vent pipe 33, Fig. 1, extending outwardly from one end of the head 13 well down toward the bottom thereof and curved around to extend vertically upward. The length of this pipe 33 may be varied as will below be further indicated.

The structure so far described brings the unit up to the point where there are a number of the members 10 resting on the floor 17 enclosing positive electrodes 27, and negative electrodes 19 are located between the members 10 and also one on the outer side of each of the outer positioned members. A housing 34 is provided to fit down over the members 10 and electrodes 19 to have an outturned flange therearound through which cap screws 35 are passed to screwthreadedly engage in the floor 17, a gasket 36 being interposed between the flange and the floor as a means of forming a tight seal around the junction of these two parts. This housing 34 is of sufficient width to provide a space between its front and back walls and the outer exposed electrodes 19. The housing also is of sufficient length as to permit its being placed down over the members 10 loosely, preferably out of contact therewith. A plurality of openings are provided through the top of the housing 34 so as to permit the pipes 32 to extend through such openings, each of the openings being provided with upturned flanges over which compression caps 37 screwthreadedly engage as a means for forming a gas tight joint between the housing and the pipe 32 in each instance. These pipes 32 extend on upwardly to be connected to a transverse header or collector 38. The housing 34 has a vertically disposed pipe 39 passing through the housing with a gas tight connection and so located that when the housing 34 is positioned on the floor 17, this pipe 39 telescopes loosely over the pipe 33, the lower end of the pipe 39 coming well down over the pipe 33 to have its lower end terminate at a distance below the top of the head 13. The housing 34 is also provided with an outlet pipe 40 here shown as extending vertically upward from the top side thereof. A water or electrolyte supply pipe 41 is provided and is here shown as being connected to discharge through the housing 34 at near the bottom thereof.

In operation of the device, a solution of sodium hydroxide in water, about an 18% solution, is carried within the housing 34 to have its level above the tops of the separators 16 and 16' and preferably maintained at a slight distance thereabove. The plates 19 are connected together while the plates 27 are likewise tied together and an electric current is supplied thereto in order to set up the electrolytic action. The separators 16 and 16' are preferably of the asbestos mat type, commonly employed as separators in such work, and while permitting the interexchange of electrical charges therethrough, prevent the flow of gases from one to the other sides of the separators. The separators in each case are formed so as to have their lower edges terminate in spaced relation from the floor 17. Within the members 10, oxygen gas is generated and rises to be confined within the heads 13 while hydrogen gas is formed outside of the members 10 and is collected within the space above the electrolyte within the housing 34. The oxygen gas flows from the heads 13 into the collecting header 38, from which header is carried a stand pipe 42 upwardly to within an inverted cup 43, the cup 43 being within a cylinder 44 normally containing water. The oxygen being discharged within the cup 43 is obliged to pass downwardly to escape from the cup 43 and thence upwardly through the water in the cylinder 44 as a means of washing the gas. The gas thus rising in the cylinder 44 may escape therefrom through the discharge pipe 45. Likewise the hydrogen gas coming through the pipe 40 is washed in the separate cylinder 46 and discharges therefrom through the pipe 47. Now as a means of maintaining a substantially constant level of the electrolyte within the unit, I employ a third cylinder 48 within which is a float member 49 operatively connected with a valve 50 which controls the flow of water into a fourth cylinder 51. The pipe 41 is carried from near the bottom of the housing 34 and is connected into the bottom of the tank 48. At a distance above the bottom of the tank 48 is an overflow opening from which leads the overflow pipe 52 downwardly to discharge into a passageway 53 which is in direct communication with the lower ends of the cylinders 44, 46 and 51. When electric current is applied to the various plates 19 and 27 in the unit and gases are being generated, as above indicated, a pressure is allowed to be built up within the unit, this pressure being substantially equal within the heads 13 and within the housing 34 since the electrolyte is free to flow to within the spaces between the separators of the members 10, and this pressure tends to force the electrolyte out through the pipe 41 and up into the cylinder 48. Normally this pressure will support a head of electrolyte or water wherein the float 49 is carried at some such position normally as indicated in Fig. 3 whereby the level of the fluid in the cylinder 48 is slightly below the overflow outlet and the float 49 is sufficiently elevated to maintain the valve 50 in a shut-off position. Using up of the water of the electrolyte within the housing 34 will cause a variation in the level of the fluid in the cylinder 48 so that eventually the float 49 drops with the reduction in pressure whereupon the valve 50 is opened and a supply of water is admitted into the cylinder 51. This newly admitted water is discharged into the cylinder 48 through the passageway 53 and pipe 52, the level of the water in the cylinder 51 necessarily having to be as high as that of the overflow opening in the cylinder 48 so as to permit the water to flow into the cylinder 48. Since the cylinders 44 and 46 are interconnected with the cylinder 51 by the passageway 53, the level of the water in all of these cylinders would be the same were it not for the pressure of the gases depressing the levels in the cylinders 44 and 46 with the resultant higher level in the cylinder 51. Also by reason of this common communicating passageway, what electrolyte is carried by the gases and washed therefrom in the cylinders 44 and 46 is returned finally to within the housing 34 by being carried with the incoming water back up the pipe 52 into the cylinder 48.

As a safety means, the pipes 33 and 39 are provided to relieve excessive pressure of gases. If the discharging pipes 45 and 47, either or both, become closed and an excessive pressure thereby be produced within the members 10 or outside thereof within the housing 34, the pipes 33 and 39 being normally submerged by their lower ends in the electrolyte will permit the escape of the electrolyte upwardly therethrough under the pressure of the gases to such an extent that finally the level of the electrolyte is lowered and the gases thus escape. The lengths of these pipes determine the pressure maintained within the unit. That is, the shorter the pipes, the lower is the head of electrolyte that may be maintained in them before it is blown out by excessive gas pressures.

Should the electrodes 19 and 27 require inspection or replacement or some defects occur in the separators 16 and 16', the housing 34 may be lifted from the floor 17 and the various members then are immediately exposed for inspection. The separator carrying members 10 may be lifted directly up from the plates 27. Insulating spacing blocks 54 and 55, Fig. 2, may de dropped over the top edges of the plates 19 as a means for spacing the electrodes rigidly between the adjacent members 10 as well as the sides of the housing 34. While not necessary, a U-shaped clamping bracket 56 may be dropped down across the members 10 as a means of tying them together to have the insulating blocks 55 compressively retained therebetween.

It is to be noted that the structure herein described provides a closed type unit wherein the gases may be generated under pressure.

While I have here shown and described my invention in the best form as now known to me, it is obvious that structural changes may be made without departing from the spirit of the invention and I therefore do not desire to be limited to this precise form beyond the limitations as may be imposed by the following claims.

I claim:

1. An electrolytic unit comprising a floor, a plurality of electrodes supported by the floor, separator carrying members about a number of the electrodes, said members having legs resting on the floor and gas collecting heads interconnecting the upper ends of the legs, separators carried by and at each side of said members to extend between the legs and the heads forming a chamber within the members open at the bottom, a housing surrounding and enclosing said electrodes and members removably secured to said floor, and gas conducting means leading from said member heads through said housing.

2. For an electrolytic unit, a gas collecting member comprising a pair of spaced apart hollow columnar legs open along their vertical, opposing sides, a head secured to and across the upper ends of the legs open along its under side, and separators removably secured to the member around the margins of the openings into the legs and head, the separators being carried thereby in vertically spaced apart planes defining a chamber therebetween opening into said legs and said head.

3. In a gas producing electrolytic device, a floor, a plurality of electrodes insulated from but supported by the floor in vertically spaced apart relation, a mat carrying member removably resting on the floor at certain of said electrodes, said member having columnar legs with vertically disposed openings adjacent the ends of the electrode and a head joining the upper ends of the electrode with an under opening adjacent the top edge of the electrode, a mat secured to the member on each side of the electrode, a housing surrounding all of the electrodes and members detachably secured to the floor, pipes leading out through the housing from the members, gas washing means receiving the discharge from the pipes, and electrolyte level control means interconnected with said pipes and washing means.

4. In an electrolytic gas producing device, a floor, a plurality of electrodes insulated from but supported by the floor, a gas collecting member removably disposed over certain of said electrodes and supported by the floor, parts of the side walls of the members being formed of a material to permit transfer of electrolyte but preventing flow of gas therethrough, a housing over and around the electrodes and enclosing members removably attached to the floor, and gas conducting means leading from the members and carried through the housing.

5. In an electrolytic gas producing device, a floor, a plurality of electrodes insulated from but supported by the floor, a gas collecting member removably disposed over certain of said electrodes and supported by the floor, parts of the side walls of the members being formed of a material to permit transfer of electrolyte but preventing flow of gas therethrough, a housing over and around the electrodes and enclosing members removably attached to the floor, and gas conducting means leading from the members and carried through the housing, and brackets on the floor spacing the lower ends of said members whereby an electrode is enclosed within each member and an electrode is left uncovered in spaced relation between adjacent members.

6. In an electrolytic gas producing device, a floor, a plurality of electrodes insulated from but supported by the floor, a gas collecting member removably disposed over certain of said electrodes and supported by the floor, parts of the side walls of the members being formed of a material to permit transfer of electrolyte but preventing flow of gas therethrough, a housing over and around the electrodes and enclosing members removably attached to the floor, and gas conducting means leading from the members and carried through the housing, a pressure relief pipe turned upwardly from one of said members and extending beyond the housing, and a second relief pipe carried by the housing telescoping over the other relief pipe and having its lower end open within the housing below the normal level of electrolyte.

7. In an electrolytic gas producing device, a floor, a plurality of electrodes insulated from but supported by the floor, a gas collecting member removably disposed over certain of said electrodes and supported by the floor, parts of the side walls of the members being formed of a material to permit transfer of electrolyte but preventing flow of gas therethrough, a housing over and around the electrodes and enclosing members removably attached to the floor, and gas conducting means leading from the members and carried through the housing, said housing in conjunction with said floor forming a vessel for holding electrolyte and for collecting gas in its upper portion, gas conducting means leading from the housing, and pressure relief means.

8. A unit for electrolytically producing gases which comprises, a floor, a removable bell-like housing open on its under side and sealably connected with the floor to form a chamber therewith, a plurality of electrodes insulated from and supported by the floor to extend upwardly within the housing, gas collecting members telescoped in spaced relation over certain electrodes removably resting on the floor, gas conducting means leading from the housing, and gas conducting means leading from said members through said housing in a removable manner.

9. For an electrolytic unit for producing gases, an electrolyte level control device comprising a vessel having a bottom opening from which a pipe is lead to below the electrolyte level in the unit, said vessel having an overflow opening spaced upwardly a distance from the bottom, a second vessel, a conduit leading from said first vessel overflow opening to the bottom of the second vessel, float means in said first vessel, and a control valve in a line discharging into the second vessel operatively connected with the float means.

10. For an electrolytic unit for producing gases, an electrolyte level control device comprising a vessel having a bottom opening from which a pipe is lead to below the electrolyte level in the unit, said vessel having an overflow opening spaced upwardly a distance from the bottom, a second vessel, a conduit leading from said first vessel overflow opening to the bottom of the second vessel, float means in said first vessel, and a control valve in a line discharging into the second vessel operatively connected with the float means, and a gas washing cylinder having an upper gas outlet and a lower flow connection with said second vessel.

11. In an electrolytic unit, a floor, a plurality of plate electrodes supported by and insulated from the floor, and means interconnecting the floor and electrodes comprising posts fastened to the electrodes and to the floor whereby the electrodes serve as truss-like members reinforcing the floor.

12. In an electrolytic cell, in combination with an electrode and a metallic floor in the cell, a metallic thimble united with the floor, a stud fixed by one end to the electrode and extending through the thimble externally of the floor, a shoulder on the stud, an insulating collar on the stud under said shoulder and above said thimble, an insulating sleeve between the thimble and the stud, a lower insulating collar about the stud below the thimble, and a nut screw-threadedly engaging the stud to cause the two collars to be compressively drawn toward the thimble, said lower collar having a drain passage therethrough whereby leakage past the upper collar may escape.

13. In an electrolytic cell, in combination with an electrode supported by the cell floor and having electrical connections through the floor, a member adapted to form a chamber about the electrode comprising a metallic hood, a leg at each end of the hood extending downwardly therefrom and resting on the cell floor, said legs being substantially U-shape in cross section, and separators secured to and forming enclosing vertical walls on each side of the member below the hood and between the legs, and a gas conducting tube leading from the hood.

14. In an electrolytic cell, in combination with an electrode supported by the cell floor and having electrical connections through the floor, a member adapted to form a chamber about the electrode comprising a metallic hood, a leg at each end of the hood extending downwardly therefrom and resting on the cell floor, said legs being substantially U-shape in cross section, and separators secured to and forming enclosing vertical walls on each side of the member below the hood and between the legs, and a gas conducting tube leading from the hood, and brackets on the cell floor intercepting the ends of said legs to space said member about said electrode.

15. In an electrolytic cell having a metallic floor, in combination with a plurality of electrodes supported by the floor and having electrical connections extending through the floor, some of the electrodes being of opposite polarity as compared to other electrodes, chamber forming members placed over one set of electrodes of common polarity, said members each having a metallic hood and metallic end supporting legs extending between the hood and resting in direct contact with said cell floor, said members having separators on each side between the hood and the end legs, and a gas tube leading from each member hood.

16. In an electrolytic cell having a metallic floor, in combination with a plurality of electrodes supported by the floor and having electrical connections extending through the floor, some of the electrodes being of opposite polarity as compared to other electrodes, chamber forming members placed over one set of electrodes of common polarity, said members each having a metallic hood and metallic end supporting legs extending between the hood and resting in direct contact with said cell floor, said members having separators on each side between the hood and the end legs, and a gas tube leading from each member hood, and a housing enclosing all of said electrodes and said members secured to the cell floor, said housing being in electrical connection with the floor and collecting gas in its upper end arising from those electrodes not covered by said members.

ORA K. ENZOR.